US010463026B2

(12) United States Patent
Naess

(10) Patent No.: US 10,463,026 B2
(45) Date of Patent: Nov. 5, 2019

(54) MODULAR BUOYANCY SYSTEM AND FLOTATION ELEMENT FOR NET CAGE

(71) Applicant: Akvadesign AS, Brønnøysund (NO)

(72) Inventor: Anders Naess, Brønnøysund (NO)

(73) Assignee: Akvadesign AS, Brønnøysund (NO)

(*) Notice: Subject to any disclaimer, the term of this patent is extended or adjusted under 35 U.S.C. 154(b) by 199 days.

(21) Appl. No.: 15/452,332

(22) PCT Filed: Sep. 8, 2015

(86) PCT No.: PCT/NO2015/050157
§ 371 (c)(1),
(2) Date: Mar. 7, 2017

(87) PCT Pub. No.: WO2016/039632
PCT Pub. Date: Mar. 17, 2016

(65) Prior Publication Data
US 2017/0202188 A1 Jul. 20, 2017

(30) Foreign Application Priority Data

Sep. 8, 2014 (NO) .................................. 20141089

(51) Int. Cl.
*A01K 61/60* (2017.01)
*A01K 61/65* (2017.01)
(Continued)

(52) U.S. Cl.
CPC ............. *A01K 61/60* (2017.01); *A01K 61/65* (2017.01); *A01K 71/00* (2013.01); *A01K 74/00* (2013.01);
(Continued)

(58) Field of Classification Search
CPC ........ A01K 61/60; A01K 61/65; A01K 61/70; A01K 61/72; A01K 61/73; A01K 61/75; A01K 61/77; A01K 71/00
See application file for complete search history.

(56) References Cited

U.S. PATENT DOCUMENTS 3,691,994 A * 9/1972 McPherson ............ A01K 61/60
119/223
4,509,459 A * 4/1985 Knowles ................ A01K 61/70
119/233
(Continued)

FOREIGN PATENT DOCUMENTS

EP 0480114 A1 * 4/1992 ............. A01K 61/60
GB 2068847 8/1981
(Continued)

OTHER PUBLICATIONS

Norwegian Search Report, Norwegian Patent Application No. 20141089, dated Feb. 27, 2015.
(Continued)

*Primary Examiner* — Kristen C Hayes
(74) *Attorney, Agent, or Firm* — Andrus Intellectual Property Law, LLP

(57) ABSTRACT

A buoyancy element is for constructing a modular buoyancy system for a circularly shaped net cage. The buoyancy element includes a cage side, an opposite straight long side, and coupling sides between the cage side and the straight long side. The cage side is curved, following the periphery of the net cage.

4 Claims, 7 Drawing Sheets

(51) Int. Cl.
*A01K 71/00* (2006.01)
*A01K 74/00* (2006.01)
*A01K 75/04* (2006.01)
*A01K 75/06* (2006.01)
*A01K 79/00* (2006.01)

(52) U.S. Cl.
CPC .............. *A01K 75/04* (2013.01); *A01K 75/06* (2013.01); *A01K 79/00* (2013.01)

(56) References Cited

U.S. PATENT DOCUMENTS

| | | | |
|---|---|---|---|
| 4,615,301 A | 10/1986 | Maekawa et al. | |
| 4,881,482 A * | 11/1989 | Sandwith | B65D 88/78 114/256 |
| 4,957,064 A | 9/1990 | Koma | |
| 5,172,649 A * | 12/1992 | Bourgeois | A01K 61/60 119/223 |

FOREIGN PATENT DOCUMENTS

| | | | | |
|---|---|---|---|---|
| JP | 04104747 A * | 4/1992 | | A01K 61/60 |
| JP | H06113695 | 4/1994 | | |
| NO | 160241 | 9/1985 | | |
| NO | 154411 | 12/1985 | | |
| NO | 320041 | 5/2003 | | |
| WO | WO-8704320 A1 * | 7/1987 | | A01K 61/60 |
| WO | 1997/038573 | 10/1997 | | |
| WO | 1998/032330 | 7/1998 | | |
| WO | 2008/134842 | 11/2008 | | |
| WO | 2010/098675 | 9/2010 | | |
| WO | 2013/085392 | 6/2013 | | |
| WO | 2013/182187 | 12/2013 | | |
| WO | WO-2017030442 A1 * | 2/2017 | | A01K 63/047 |

OTHER PUBLICATIONS

International Search Report, PCT/N02015/050157, dated Nov. 17, 2015.
International Written Opinion, PCT/N02015/050157, dated Nov. 17, 2015.
International Preliminary Report on Patentability, PCT/N02015/050157, date of completion Dec. 13, 2016.

* cited by examiner

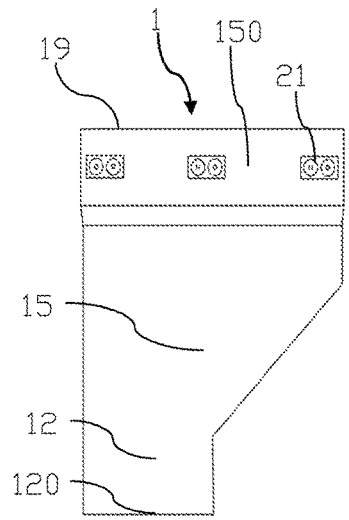
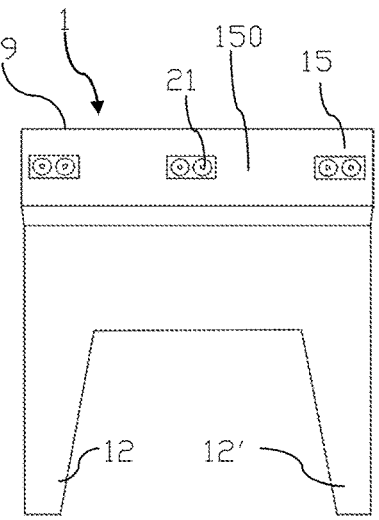
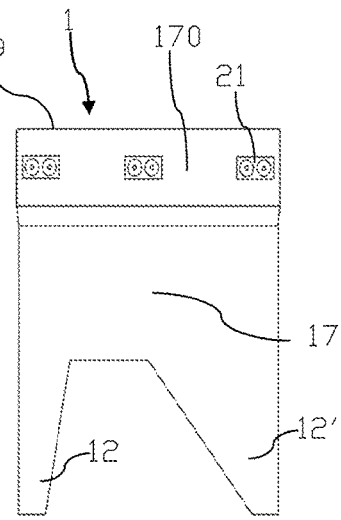
Fig. 2A    Fig. 2B    Fig. 2C
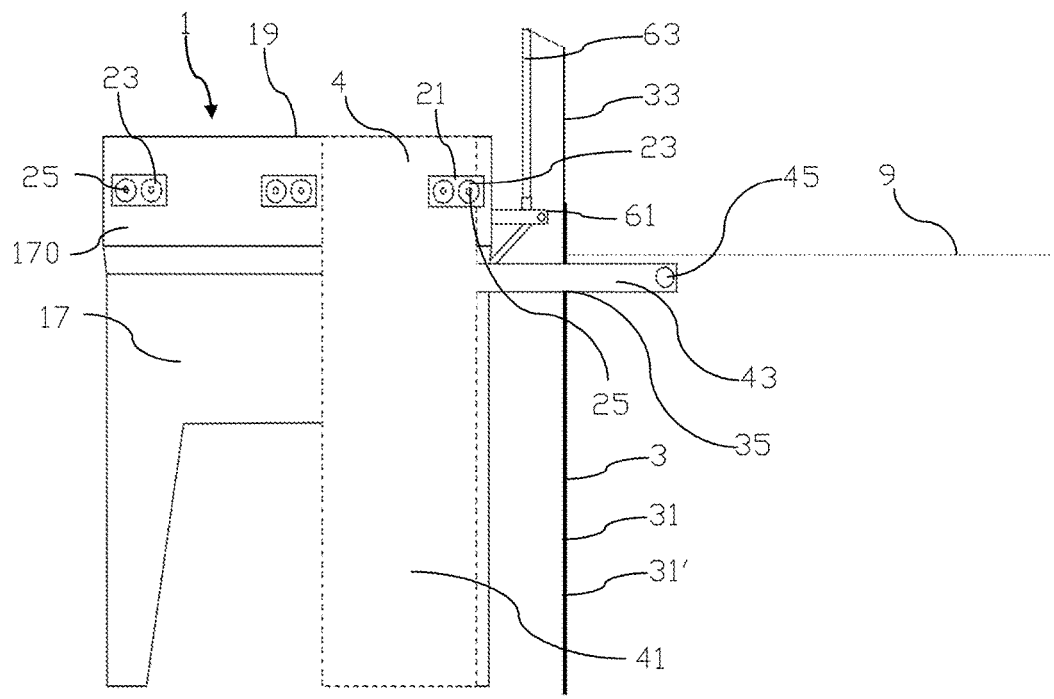
Fig. 3

MODULAR BUOYANCY SYSTEM AND FLOTATION ELEMENT FOR NET CAGE

FIELD

The invention relates to a buoyancy element. More particularly, the invention relates to a buoyancy element which is arranged to be connected to several buoyancy elements to form a modular buoyancy system. The buoyancy system may be used in aquaculture and is especially suitable for forming a floating work platform between two or more net cages for fish-farming.

BACKGROUND

Aquaculture is a rapidly growing global industry. The conventional fish catches are decreasing dramatically and the future requirement for seafood must be met through aquaculture.

However, in recent years, several challenges have arisen, with which this industry is faced. For salmonid-farming this concerns, among other things, the treatment of fish infected with crustacean parasites such as salmon louse, the escape of fish from floating farming cages, diseases due to viruses, bacteria and parasites, so-called "genetic pollution" of wild populations of salmonids, and emissions of waste products from the net cages to recipients. These challenges are particularly relevant to the farming of fish in conventional, floating flow-through cages. Such open net cages consist of a net forming a closed enclosure for fish in particular and being held afloat by means of an encircling buoyancy system.

Buoyancy systems for floating net cages may be divided into two main groups, so-called steel cages and so-called plastic cages. Steel cages consist of rectangular walkways in steel provided with floats on their bottom side. Each float may have the shape of a rectangular box. The walkways are joined together by hinges. The steel cages form a grid with longitudinal and transverse walkways. Each side of a square may be, for example, 10 m or 12 m long. The seines, which form closed enclosures, are placed in the grid and attached to the steel cages on hooks projecting from special posts or supports. Steel cages are also provided with railing, and the net may be attached to a handrail with hooks or lashings. The upper edge of the seine is thereby raised above the water surface, thus also forming a jump-fence to prevent fish from escaping from the net cage by jumping over the edge. The walkway forms a relatively stable platform for the movement of personnel and equipment. Equipment and feed can be stored on the walkways.

A plastic cage consists of at least one plastic pipe which is welded together into a ring. The plastic cage usually consists of two concentric rings. Plastic cages with three concentric plastic rings are known as well. The plastic pipe may be a continuous plastic pipe which is joined together at the ends into a ring. The plastic pipe may also be formed from straight pipe sections which are welded together into a polygonal ring. The ring may be octagonal, decagonal and so on.

The plastic rings are connected with radially oriented brackets in plastic or steel. Walkways may be placed on top of two concentric rings. The seine, forming a closed enclosure, is placed within the innermost pipe in the buoyancy system and fixed with projecting seine hooks. The seine hooks may be attached to the pipe or to a railing projecting up from the buoyancy system. The circumference of the seine in a plastic cage may be, for example, between 90 m and 160 m long, corresponding to a diameter of between 30 m and 50 m. The plastic rings are formed in fixed lengths and cannot very easily be length-adjusted. The walkway is relatively narrow. The rings and the walkway will follow the wave motions. The walkway is not suitable for storing equipment and only relatively light equipment can be moved along the walkway. The walkway extends around only one net cage. Personnel are dependent on a boat in order to move from one net cage over to another net cage.

Closed farming cages are known in the art. These are formed from a tight cloth material which forms a closed enclosure for aquatic organisms such as fish. To ensure that the water exchange rate is sufficient to maintain a minimum oxygen level in the water inside the cage, it is common to pump so much water in that the water surface inside the cage is higher than the water surface outside the cage. The pressure inside the cage is thereby greater than the ambient pressure and water will flow out of the cage through openings formed. This subjects the buoyancy system of a closed cage to greater forces than the buoyancy system of an open cage of the same size. In addition to keeping the cloth or net itself of the cage afloat, the buoyancy of the buoyancy system must be dimensioned for holding the amount of water inside the cage that is above the water surface of the surrounding water. This water constitutes a considerable mass. In addition, this water has a moment of inertia that causes the wave influence on the buoyancy system to be greater than in an open cage in which the wave motion substantially unobstructedly passes the buoyancy system and into the cage.

The nets of open net cages are attached to the buoyancy system by the buoyancy system being provided with projecting hooks. The buoyancy system may be provided with a handrail and the projecting hooks may be attached to the handrail. From so-called steel cages it is known to use special posts or supports provided with such hooks. The hooks may also be attached to floating rings which form a buoyancy system.

The patent publication GB 2068847 discloses a plurality of rectangular buoyancy elements made of concrete, which are held together by a wire or chain. The wire or chain extends through flush, elongated channels inside the buoyancy elements. In their adjacent end faces, the elements are formed with recesses at the mouths of the channels. A spacer formed of an elastic material is positioned in the recesses of the two adjacent end faces between two neighbouring buoyancy elements. The spacer is provided with a through bore for the wire or chain. The elastic spacer absorbs longitudinal forces so that neighbouring elements will not collide, counteracts relative vertical and horizontal lateral movements between two neighbouring elements, while, at the same time, allowing a certain degree of twisting and rotation between two neighbouring elements.

SUMMARY

The invention has for its object to remedy or reduce at least one of the drawbacks of the prior art or at least provide a useful alternative to the prior art.

The object is achieved through the features which are specified in the description below and in the claims that follow.

The invention is defined by the independent claim. The dependent claims define advantageous embodiments of the invention.

The invention relates, more specifically, to a buoyancy element for constructing a modular buoyancy system for a circularly shaped net cage, the buoyancy element including a cage side, facing the net cage, an opposite straight long side and coupling sides between the cage side and the straight long side. The cage side is arcuate, following the periphery of the net cage.

The straight long side and the coupling sides may form three sides of a trapezium, viewed from above, in the position of application. If it were straight, the cage side would have formed the fourth side of the trapezium. Since the cage side is curved, the buoyancy element is not shaped as a true trapezium viewed from above. The angle formed between the straight long side and one coupling side may be acute. The angle formed between the straight long side and one of the coupling sides may be a right angle.

The cage side may be provided with a plurality of mounting brackets which carry a curved, elongated body, wherein the elongated body follows the periphery of the net cage and the net cage may be secured to the elongated body.

The buoyancy element may be provided with a pump well extending from a top side to a bottom side. The buoyancy element may be provided with a passage with a first mouth on the cage side and a second mouth on the top side.

The straight long side and the coupling sides may each be provided with a plurality of connecting units. The straight long side and the coupling sides may each be provided with a projection and the connecting unit is positioned in the projection.

The invention also includes a modular buoyancy system, in which one module of the buoyancy system may comprise a buoyancy element as described in the foregoing, and in which the buoyancy elements may be connected to each other along the coupling sides in a number that encircles the net cage. The invention also includes a facility for aquaculture which includes a plurality of net cages, in which each net cage is kept afloat by a buoyancy system, and in which several buoyancy systems are connected along the straight long sides of adjacent buoyancy elements. In the facility for aquaculture, one polygonal opening may form between adjacent buoyancy systems, and the opening may be provided with bridge piers and a bridge.

The size of the buoyancy elements requires that the buoyancy elements be made from a material that can resist great forces. The buoyancy elements may be formed from a metal, such as steel. The buoyancy elements may also be formed from concrete, especially reinforced concrete.

BRIEF DESCRIPTION OF THE DRAWINGS

In what follows, examples of preferred embodiments are described, which are visualized in the accompanying drawings, in which:

FIGS. 2A-C shows side views on a larger scale of a buoyancy element in alternative embodiments;

FIG. 3 shows a partially cut-away side view on a larger scale of a buoyancy element in a further alternative embodiment;

DETAILED DESCRIPTION OF THE DRAWINGS

Figure 1:
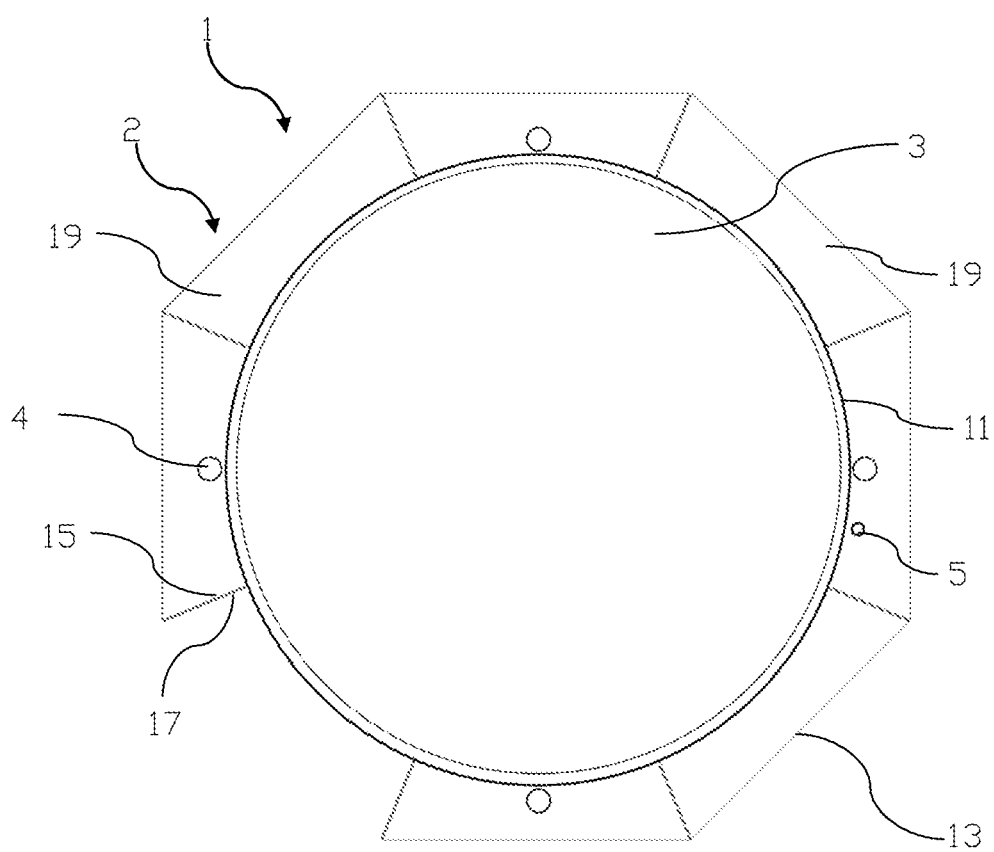
FIG. 1 shows a combination of buoyancy elements according to the invention for the formation of a buoyancy system for a net cage.

In the drawings, the reference numeral 1 indicates a buoyancy element which can modularly be put together into a modular buoyancy system 2. The buoyancy system 2 keeps a net cage 3 afloat, which, viewed from above, has a circular circumference.

The buoyancy element 1 is formed with a cage side 11 facing the circularly shaped net cage 3 in the position of application, an opposite straight long side 13 and with coupling sides 15, 17 between the cage side 11 and the straight long side 13. The buoyancy element 1 is formed with a plane top side 19.

In the embodiments shown, the cage side 11, viewed from above, is formed as a concave arc so that the cage side 11 will follow the circularly shaped periphery of the net cage 3. Viewed from above in the position of application, the straight long side 13 and the coupling sides 15, 17 constitute sides of a polygon, more particularly three of the sides of a trapezium. The cage side 11, if it were straight, would have formed the fourth side of the trapezium. As the cage side 11 is curved, the buoyancy element 1 is not formed as a true trapezium, viewed from above.

A plurality of buoyancy elements 1 are connected at their coupling sides 15, 17 so that they form a continuous buoyancy system 2 for the net cage 3. Because of the curved cage sides 11, the buoyancy system 2 will form a buoyancy system adapted to the circularly shaped net cage 3. The net cage 3 may be an open net cage 3 formed from a seine bag 31, a closed cage 3 formed from a liquid-tight cloth or wall 31', or a semi-closed cage 3. The net cage 3 may have a circumference of 70 m and a volume of 3000 $m^3$. In an alternative embodiment, the net cage 3 may have a circumference of 90 m and a volume of 6000 $m^3$. Other circumferences and other volumes of the net cage 3 are also possible and the invention is not restricted to net cages 3 of this size.

The angle between the straight side 13 and the coupling sides 15, 17 may vary. In the examples shown, the angle is substantially 45° and eight buoyancy elements 1 form an octagonal when connected to each other. The straight long sides 13 are shown as having the same length. The person skilled in the art will know that an octagon may also be made with buoyancy elements 1 having different straight long sides, wherein the angles between the straight long side 1 and the coupling sides 15, 17 have been adjusted accordingly. The person skilled in the art will also know that other polygons may be formed in this way, such as a hexagon or a decagon.

Figure 4:
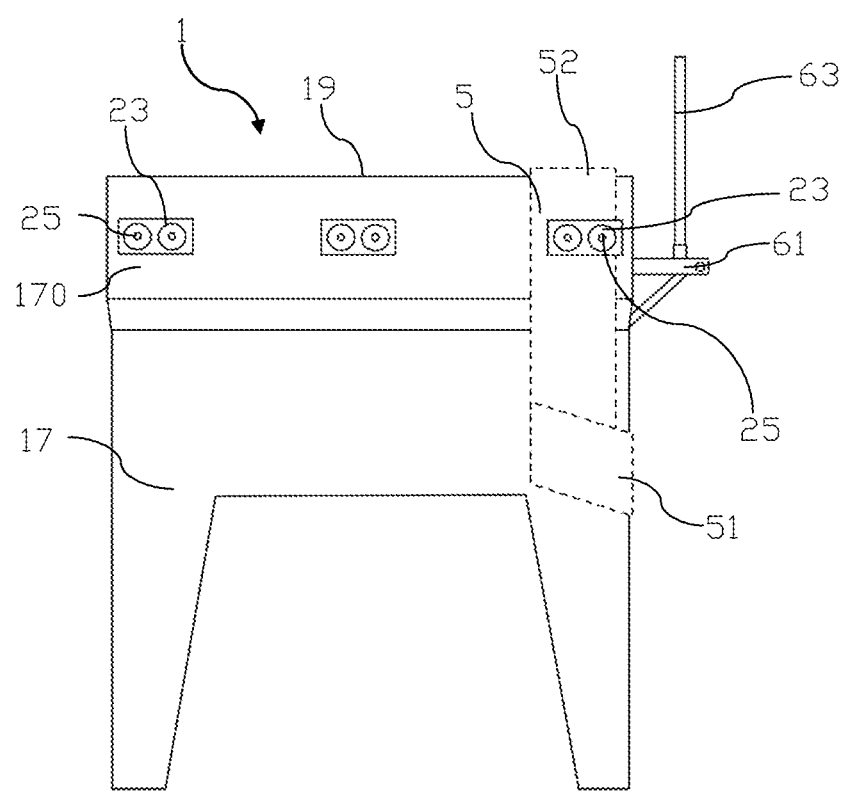
FIG. 4 shows a partially cut-away side view on the same scale as FIG. 3 of a buoyancy element in a further alternative embodiment.
Figure 5:
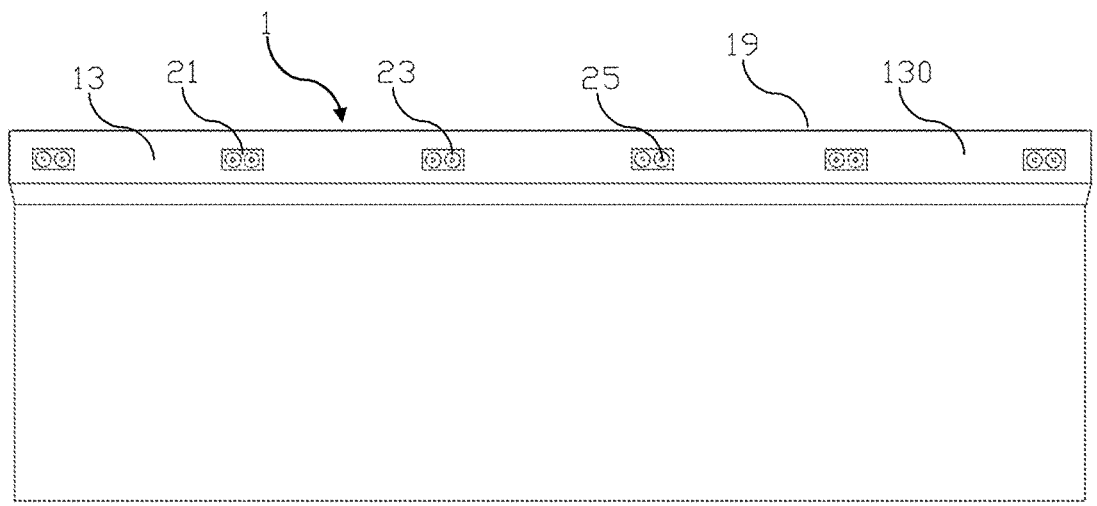
FIG. 5 shows a side view on a smaller scale of a buoyancy element viewed from the straight long side of the buoyancy element.

The buoyancy element 1 may be provided with pump well 4 as shown in FIG. 3. The buoyancy element 1 may be provided with a passage 5 as shown in FIG. 4.

In one embodiment, the buoyancy element 1 may be provided with a plurality of mounting brackets 61 on the cage side 11. The mounting bracket 61 may form the base for a fence post 63. The mounting bracket 61 may also form the base for an attachment hook (not shown) for the attachment of the seine in an open net cage 3. In its upper portion, the net cage 3 is provided with a jump-net 33 projecting above a water surface 9. The jump-net 33 is secured to the fence post 63 as shown in FIG. 3.

Figure 6:
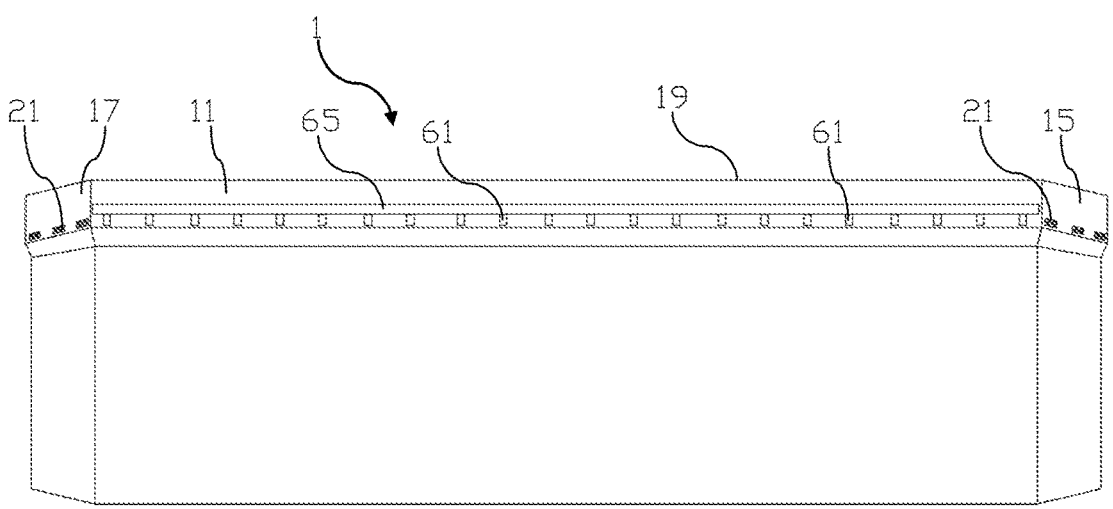
FIG. 6 shows a side view on the same scale as FIG. 6 of a buoyancy element viewed from the cage side of the buoyancy element.

The mounting brackets 61 may carry an elongated body 65 as shown in FIG. 6. The elongated body 65 may be a pipe. The elongated body 65 may be a solid rod. The elongated body 65 is curved, following the periphery of the circularly shaped net cage 3. A closed cage 3 or a partially closed cage 3 may be secured to the elongated body 65.

In one embodiment, the buoyancy element 1 may be formed with one keel 12 as shown in FIG. 2A. It is advantageous that the keel 12 is not symmetrical under the buoyancy element 1, but that the keel 12 is closer to the cage side 11 than to the straight long side 13. It is thereby achieved that the buoyancy element 1 has its greatest buoyancy on the cage side 11, which is particularly advantageous when the cage 3 is a closed cage 3. The bottom side 120 of the keel 12 may be substantially parallel to the top side 19. This is advantageous when the buoyancy element 1 is placed on land. The buoyancy element 1 will then remain upright in its position of application.

In an alternative embodiment, the buoyancy element 1 may be formed with two keels 12, 12' as shown in FIGS. 2B and 2C. The keels 12, 12' may be symmetrically formed as shown in FIG. 2B or asymmetric as shown in FIG. 2C. A buoyancy element 1 with two keels 12, 12' will stand stably in its position of application on land.

The profile of the keels 12, 12' may vary in the longitudinal direction of the buoyancy element 1. The profile of the keels 12, 12' at the coupling sides 15, 17 may be different from the profile at the middle portion of the buoyancy element 1.

The keel 12, 12' may project so far into the sea that the keel 12, 12' works as a breakwater, thereby protecting the net cage 3 from waves. The keel 12, 12' also protects the net cage 3 against drifting ice.

The pump well 4 may include a through pipe 41 in the buoyancy element 1 as shown in FIG. 3. The pump well 4 extends from the top side 19 to the bottom side. In one embodiment, the pipe 41 may be attached to the upper portion of the buoyancy element 1 and may project freely down below the buoyancy element 1 at the side of one keel 12 or, in an alternative embodiment, between two keels 12, 12'. The pipe 41 may project as far down as the keel 12, 12' or somewhat shorter than the keel 12, 12'. In an alternative embodiment, in a position of application, the pipe 41 may project further down than the keel 12, 12'. In this embodiment, the pipe 41 may be displaceable in the pump well 4 so that the pipe 41 projects above the top side 19 when the buoyancy element 1 is standing on land, and so that the pipe 41 is lowered after the buoyancy element 1 has been set afloat.

A pump (not shown), which is supplied with water from the desired depth through an inlet (not shown), is housed in the pump well 4. A jet pipe 43 on the outlet side of the pump is extended from the pump well 4, through the cage side 11 of the buoyancy element 1 and through an opening 35 in the tight cloth or wall 31' of a closed cage 3.

Water flows through the jet pipe 43 and out of the jet pipe 43 at one or more jet holes 45 on the inside of the cage 3.

The pump well 4 may be covered with a lid or a grating (not shown), so that personnel (not shown) may walk across and equipment (not shown) can be moved across the pump well 4.

The passage 5 is shown in greater detail in FIG. 4. The passage 5 has a first mouth 51 on the cage side 11 of the buoyancy element 1 and a second mouth 52 on the top side 19 of the buoyancy element 1. The passage 5 may include a pipe. One or more hoses or pipes (not shown) may be extended through the passage 5 from the top side 19 of the buoyancy element 1 to the lower portion of the net cage 3. The hose may service a dead-fish outlet (not shown) or a sludge outlet (not shown) as is known in the art.

Figure 7:
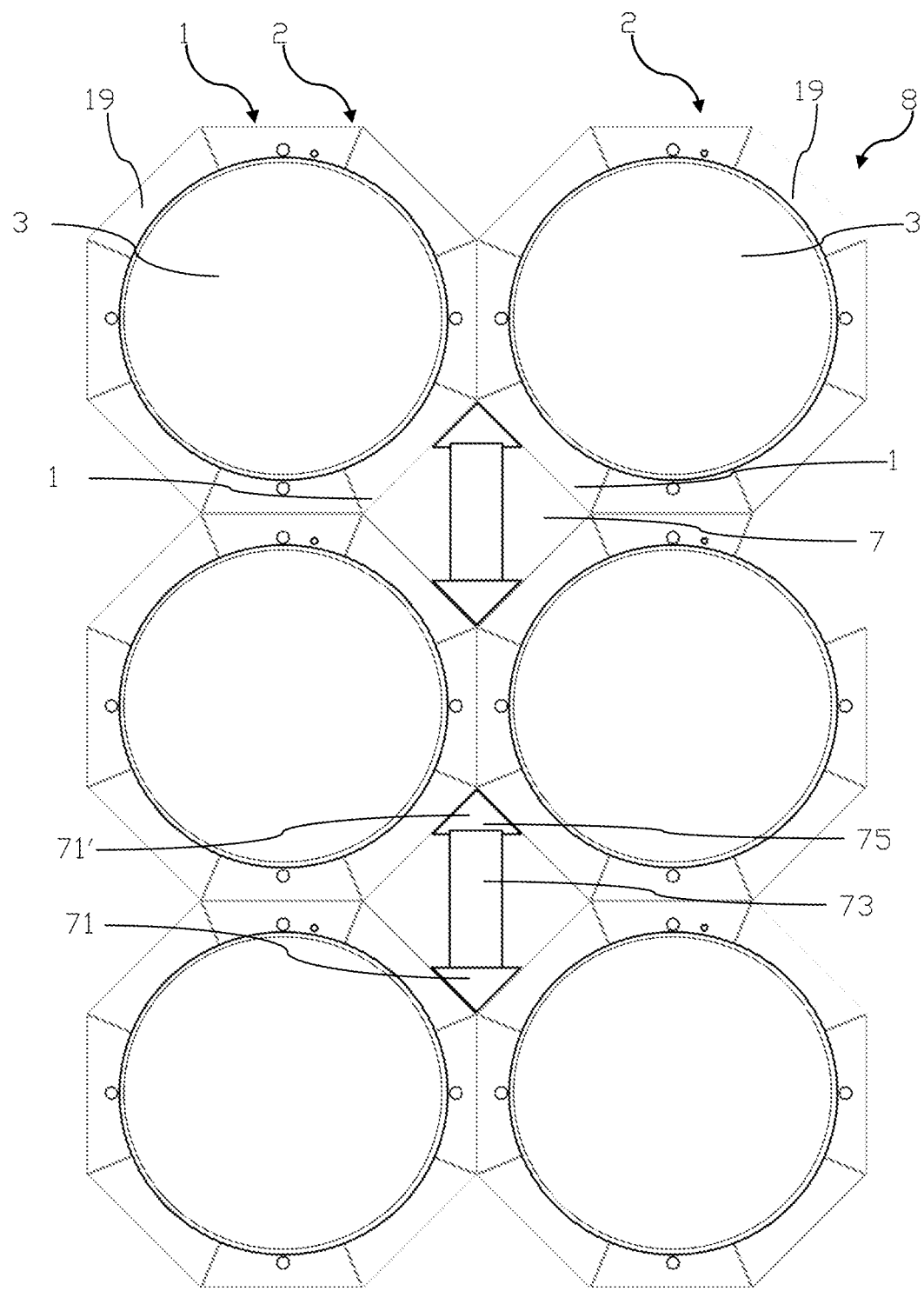
FIG. 7 shows, on a different scale, a combination of several buoyancy systems for the formation of a work area between several net cages.
Figure 8:
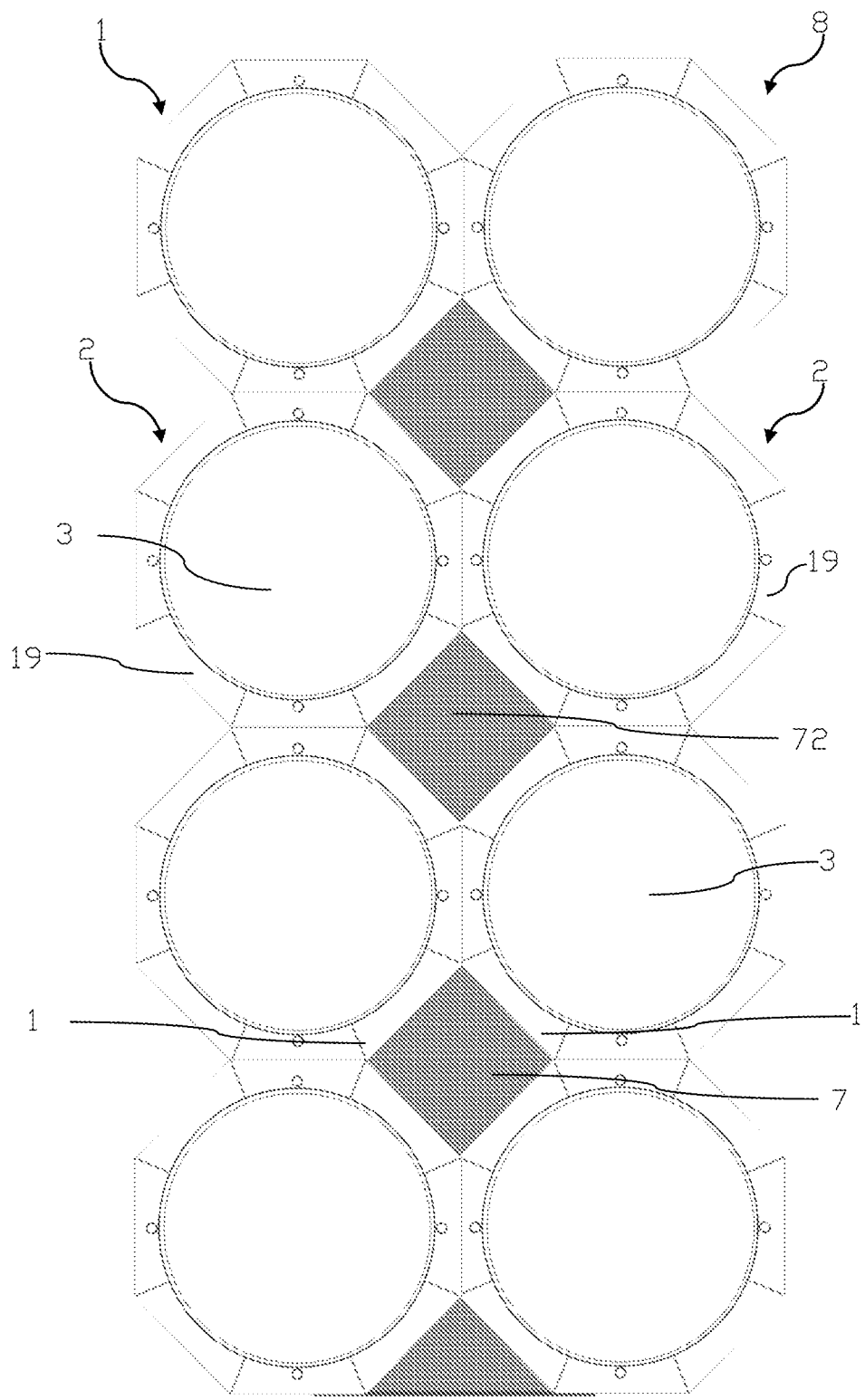
FIG. 8 shows, on a smaller scale than FIG. 7, an alternative embodiment of a work area between several net cages.

On its straight long side 13 and on its coupling sides 15, 17, the buoyancy element 1 is provided with a plurality of connecting units 21. A damper 23 in a polymer material is positioned in the connecting unit 21. The connecting unit 21 includes an opening 25 for the passage of a chain (not shown) or a wire (not shown) or a rope (not shown). Several buoyancy elements 1 are connected with a chain, wire or rope in aligned connecting units 21 in the straight long sides 13 and in the coupling sides 15, 57. FIG. 1 shows the interconnection of eight buoyancy elements 1, where the coupling side 15 of the buoyancy element 1 is connected to the coupling side 17 of a neighbouring buoyancy element 1. FIG. 7 and FIG. 8 show how the straight long side 13 of the buoyancy element 1 is connected to the straight long side 13 of the neighbouring buoyancy element 1. The dampers 23 allow the buoyancy elements 1 to scissor relative to each other in the horizontal plane to follow wave motions. The chains, wires or ropes are tightened so that the buoyancy elements 1 substantially cannot be displaced relative to each other in the longitudinal directions of the straight long side 13 or the coupling sides 15, 17.

The straight long side 13 may be provided, in its upper portion, with a projection 130 horizontal in the position of application. The coupling sides 15, 17 may be provided, at their upper portions, with a projection 150, 170 horizontal in the position of application. The projection 130, 150, 170 allow the buoyancy elements 1 to follow wave motions more freely when interconnected. The connecting unit 21 may be positioned in the projection 130, 150, 170.

A facility for aquaculture 8 may include several net cages 3 which are each kept afloat by a separate modular buoyancy system 2. The net cages 3 may be interconnected by the straight long side 13 of one suitable buoyancy element 1 in one buoyancy system 2 being connected to the straight long side 13 of one suitable buoyancy element 1 of one other adjacent buoyancy system 2, as is shown in FIGS. 7 and 8. At least one polygonal opening 7 is formed between the buoyancy systems 2 when there are four buoyancy systems 2 arranged in a square. The shape of the polygonal openings 7 depends on the geometry of the buoyancy system 2. In the exemplary embodiments, octagonal buoyancy systems 2 are shown, forming quadrilateral openings 7 between them.

Between two neighbouring buoyancy elements 1 which each have a free, outward, straight long side 13 facing the opening 7, a bridge pier 71 may be attached. The bridge pier 71 may be secured to the buoyancy element 1 at one or more of the connecting units 21 with dampers 23 between the floating unit 21 and the bridge pier 71. In the opposite corner of the opening 7, a corresponding bridge pier 71' may be fixed. There may be a bridge 73 extending between the bridge pier 71 and the bridge pier 71'. The bridge 73 may be hingingly attached to the bridge pier 71 and rest on the bridge pier 71' on a sliding surface 75.

Together with one or more bridges 73 and bridge piers 71, the plane top sides 19 will form a continuous work surface. The bridges 73 make it possible to move in a straight line between several buoyancy systems 2. This is advantageous and allows personnel (not shown) and equipment (not shown) to be moved in a quick way between the net cages 3.

Figure 9:
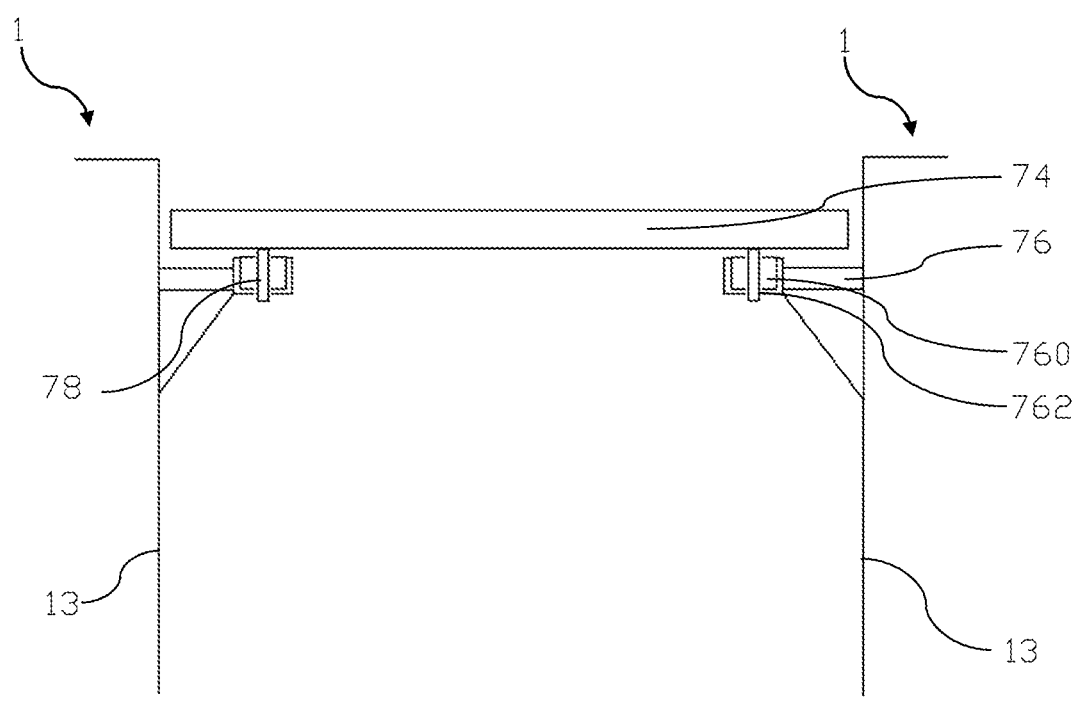
FIG. 9 shows, on a larger scale, a detail for attaching a floor shown in FIG. 8 to a buoyancy element.

An alternative embodiment of a facility for aquaculture 8 is shown in FIG. 8. The opening 7 is provided with a movable floor 72. The floor 72 may consist of a grating, for example a grating in expanded metal. The floor 72 may lie loose within an outer frame 74 surrounding the floor 72. The outer frame 74 may be formed from metal. In an alternative embodiment, the floor 72 may comprise several gratings lying as inserts in a framework of metal beams in the outer frame 74. At its corners, the outer frame 74 may rest on brackets 76 which are positioned in the straight long side 13 of the buoyancy element 1, facing the opening 7. The bracket 76 is provided with soft or resilient damping elements 760 in a polymer material so that the damping elements 760 lie between the outer frame 74 and the bracket 76 as shown in FIG. 9. On its bottom side, the outer frame 74 is provided with a rod 78 projecting downwards and having been passed through a hole 762 in the bracket 76. At its free end portion, the rod 78 is provided with a locked securing plate (not shown) under the bracket 76 so that the rod 78 cannot get out of the hole 760. The securing plate may be locked with a cotter pin (not shown), for example, as is known in the art.

The buoyancy element 1 may be provided with through channels (not shown) for carrying hoses, pipes and wiring. Thereby water, gas and electricity may be conveyed. Chains, wires or ropes for interconnecting several buoyancy elements 1 are carried in separate channels.

The buoyancy element 1 is provided with one or more internal cavities (not shown). The cavity may be completely or partially filled with a special buoyancy means, such as a polymer, especially a foamed or porous polymer. A suitable example of a porous polymer is polystyrene.

Hollow buoyancy elements 1 of the size that is described may advantageously be made from concrete, especially reinforced concrete.

It should be noted that all the above-mentioned embodiments illustrate the invention, but do not restrict it, and persons skilled in the art may construct many alternative embodiments without departing from the scope of the dependent claims. In the claims, reference numbers in brackets are not to be regarded as restrictive. The use of the verb "to comprise" and its different forms, does not exclude the presence of elements or steps that are not mentioned in the claims. The indefinite article "a" or "an" before an element does not exclude the presence of several such elements. The fact that some features are specified in mutually different dependent claims does not indicate that a combination of these features cannot be used with advantage.

The invention claimed is:

1. A buoyancy element for constructing a modular buoyancy system for a circularly shaped net cage, wherein the buoyancy element comprises a cage side, an opposite straight long side, and coupling sides between the cage side and the straight long side, wherein the cage side is curved and follows configured to follow a periphery of the net cage, and wherein the straight long side and the coupling sides are each provided with a projection in which a connecting unit is positioned; and a pump well extending from a top side to a bottom side.

2. A buoyancy element for constructing a modular buoyancy system for a circularly shaped net cage, wherein the buoyancy element comprises a cage side, an opposite straight long side, and coupling sides between the cage side and the straight long side, wherein the cage side is curved and follows configured to follow a periphery of the net cage, and wherein the straight long side and the coupling sides are each provided with a projection in which a connecting unit is positioned; and a passage with a first mouth on the cage side and a second mouth on a top side.

3. A facility for aquaculture which includes a plurality of net cages, wherein each net cage is kept afloat by a modular buoyancy system wherein at least one module of the modular buoyancy system comprises a buoyancy element having a cage side, an opposite straight long side, and coupling sides between the cage side and the straight long side, wherein the cage side is curved and follows a periphery of a circularly shaped net cage, wherein the buoyancy element is one of a plurality of buoyancy elements that are connected to each other along coupling sides in a number encircling the net cage and wherein the modular buoyancy system is one of a plurality of modular buoyancy systems which are connected along the straight long sides of adjacent buoyancy elements therein.

4. The facility for aquaculture according to claim 3, wherein, between adjacent modular buoyancy systems in the plurality of modular buoyancy systems, a polygonal opening is formed, and wherein the opening is provided with at least one bridge pier and a bridge.

* * * * *